Feb. 28, 1928.
S. P. WITHROW
1,660,465
ELEVATOR FOR UNDERGROUND GARAGES
Filed Nov. 2, 1926
3 Sheets-Sheet 1
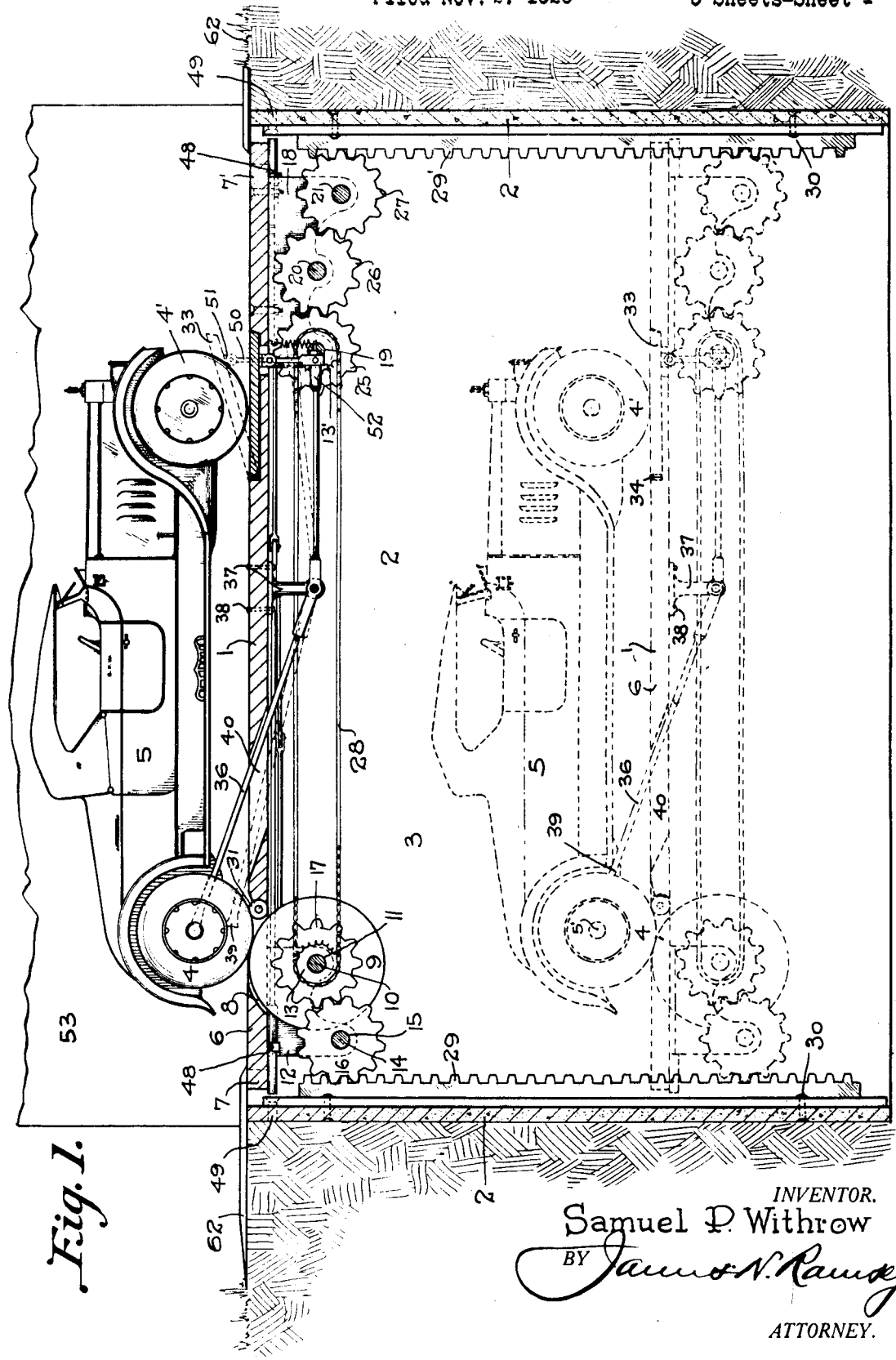
INVENTOR.
Samuel P. Withrow
BY
ATTORNEY.

Feb. 28, 1928.  
S. P. WITHROW  
1,660,465  
ELEVATOR FOR UNDERGROUND GARAGES  
Filed Nov. 2, 1926  
3 Sheets-Sheet 2

INVENTOR.  
Samuel P. Withrow  
BY James N. Ramsey  
ATTORNEY.

Feb. 28, 1928.
S. P. WITHROW
1,660,465
ELEVATOR FOR UNDERGROUND GARAGES
Filed Nov. 2, 1926     3 Sheets-Sheet 3
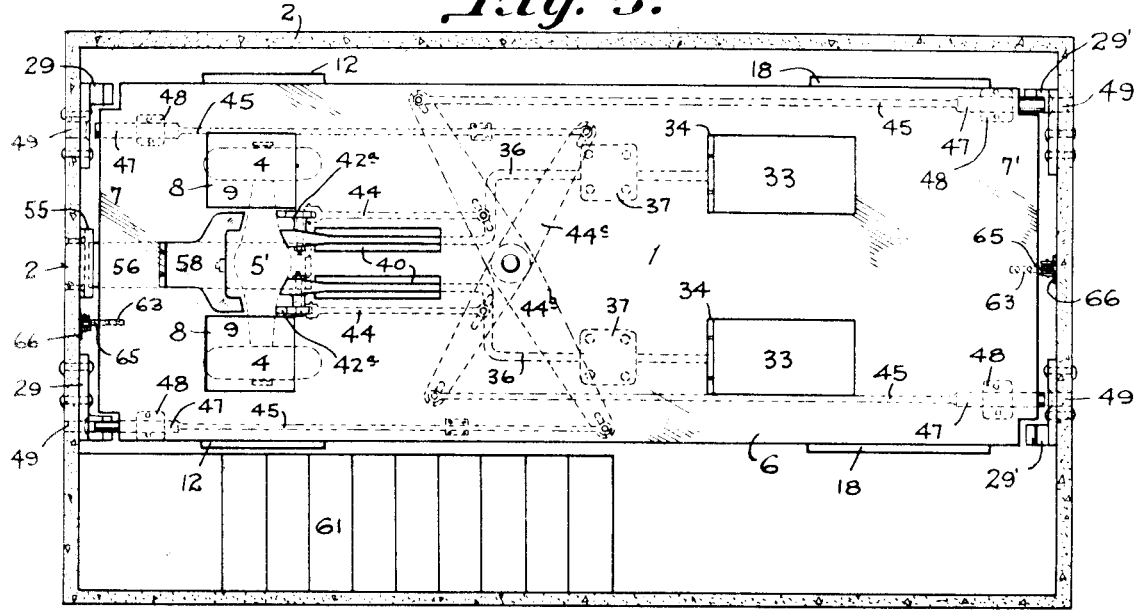
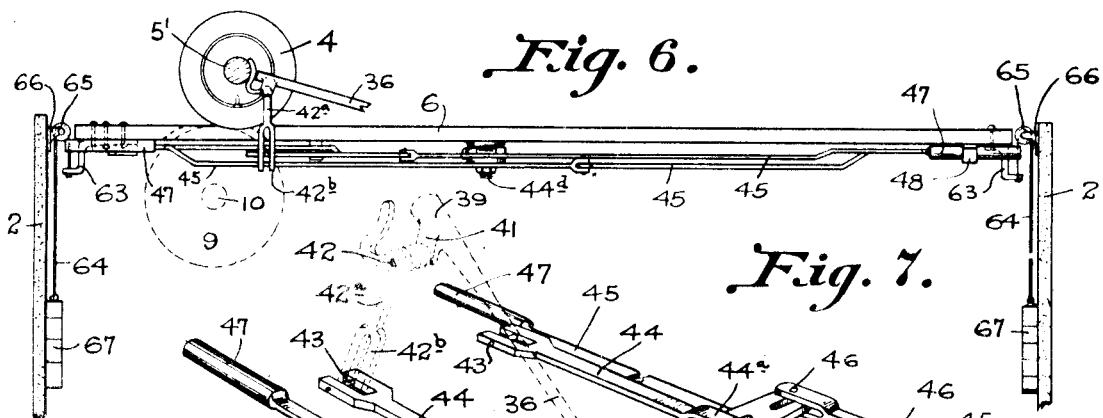
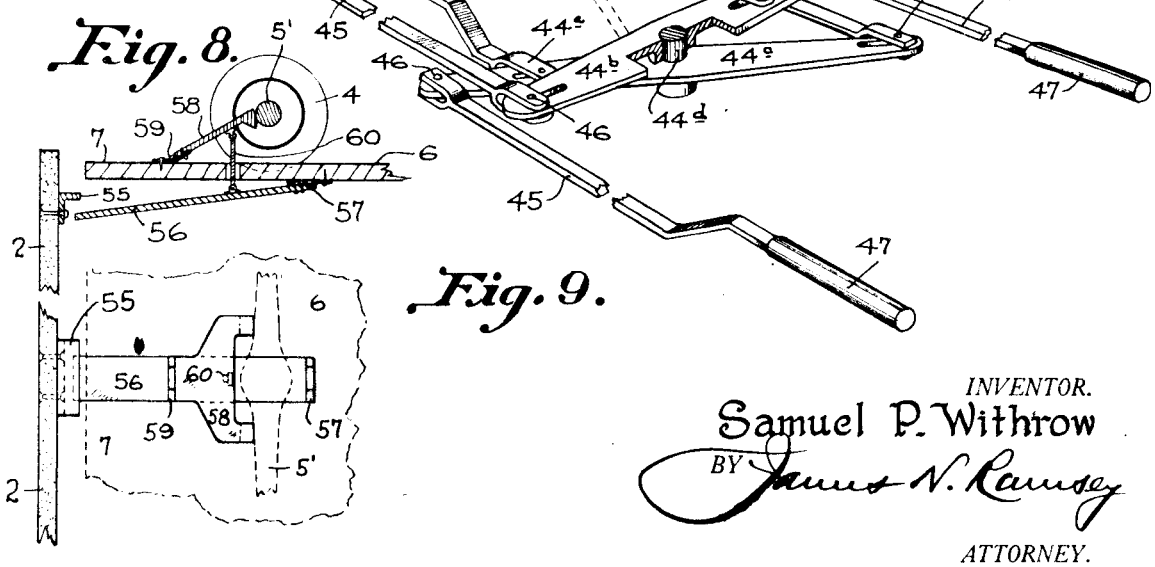
INVENTOR.
Samuel P. Withrow
BY James N. Ramsey
ATTORNEY.

Patented Feb. 28, 1928.

1,660,465

UNITED STATES PATENT OFFICE.

SAMUEL P. WITHROW, OF CINCINNATI, OHIO.

ELEVATOR FOR UNDERGROUND GARAGES.

Application filed November 2, 1926. Serial No. 145,844.

My invention relates to automobile elevators for underground garages and more particularly to elevators having means thereon adapted to be brought into driving engagement with the driven wheels of the automobile by the running of the latter onto the elevator platform and thereby to cause the elevator to ascend or descend with the automobile thereon by power derived from the latter.

A further object of my invention is to make said driving means of said platform automatic in operation so that the operator or chauffeur in said automobile has only to drive upon said platform whereby said platform is elevated or lowered according to the direction of rotation of the driving wheels of said automobile.

Further objects of my invention are to provide said elevator lowering and raising means which will be simple, efficient, economical and conveniently operated.

My invention consists in the construction, combination, location and arrangement of parts as herein set forth.

In the drawings:

Fig. 1 is a side elevation of an elevator having my invention embodied therein, its lowest position shown by dotted lines and a portion of the fixed elevator structure shown in section;

Fig. 2 is a plan view of Fig. 1 showing only parts of the automobile upon the platform;

Fig. 3 is a vertical section taken on line 3—3 of Fig. 2;

Fig. 4 is an enlarged detail view of the platform locking release arm and a portion of the rear axle of the automobile shown in section, and its relation to said release arm;

Fig. 5 is an enlarged detail plan view of the platform locking mechanism;

Fig. 6 is a longitudinal vertical section of Fig. 5;

Fig. 7 is a perspective view of the locking mechanism, parts shown in dotted lines and parts broken away;

Fig. 8 is a detail view of the rear-stop mechanism, shown in vertical section; and Fig. 9 is a plan view of the parts shown in Fig. 8.

In the embodiment of my invention as illustrated and which shows a preferred construction, I provide elevator platform 6 which is adapted to be raised or lowered within walls 2 of underground garage 3 through mechanism attached to said elevator 1 and operated by power derived from the rear driving wheels 4 of automobile 5. The elevator 1 comprises platform 6 which is provided near end 7 with openings 8, said openings being spaced apart from each other sufficiently to receive rear driving wheels 4 of automobile 5. Large rollers or drums 9 are securely attached to shaft 10 and are located within openings 8 of platform 6. Shaft 10 is rotatably supported by suitable bearings 11 in brackets 12 mounted on platform 6. Sprocket 13 is securely fixed on shaft 10 and is centrally located between large rollers 9. Shaft 14 is rotatably mounted in suitable bearings 15, also in brackets 12, and is provided near its end with gears 16 which are in meshing relation with gears 17 securely fixed near the end of shaft 10. Brackets 18 fixed to the sides of, and near the end 7' of platform 6 rotatably receive shafts 19, 20 and 21, respectively, in bearings 22, 23 and 24, respectively. Said shafts 19, 20 and 21, respectively, are provided near their ends with gears 25, 26 and 27, respectively, which are in meshing relation with one another. Sprocket 13' is fixed to shaft 19 and is centrally located between gears 25. Sprockets 13 and 13' are caused to turn in unison by chain 28. Gears 16 fixed to shaft 14 are in meshing engagement with racks 29, and gears 27 fixed to shaft 21 are in meshing engagement with racks 29', said racks 29 and 29' being suitably secured to end walls 2 of underground garage 3 in any suitable manner, as for example, by rivets 30. Platform 6 has the corner thereof cut away at 6' (Fig. 2) to provide clearance space for racks 29 and 29', respectively, when said platform is raised or lowered. Small rollers 31 rotatably mounted on shafts 32 are positioned near the forward ends of openings 8, said shafts 32 being supported by platform 6, as shown in Figs. 1 and 2. Doors 33 cut from platform 6 and then attached to the latter by hinges 34 are in alinement with openings 8, as clearly shown in Fig. 2. When automobile 5 is driven on platform 6, front wheels 4' rest on top of doors 33, but when said automobile is not on said platform, doors 33 are drawn upward by springs 35 to the position shown by dotted lines in Fig. 1.

In order to drive automobile 5 upon platform 6 when said platform is in elevated position, as shown by full lines in Fig. 1, it is necessary to lock the platform in elevated position so that the weight of automobile 5 will not cause elevator 1 to descend until the proper time or until the entire automobile is upon the platform.

*Platform locking device.*—The platform locking device comprises arms 36 pivotally mounted on supports 37 which are securely fixed to the underside of platform 6 (as shown in Fig. 1) by bolts 38. Ends 39 of arms 36, extend backward from said supports 37 and upward through slotted openings 40 in platform 6. Downwardly projecting lugs 41 (Figs. 4, 5 and 7, respectively) located at the ends 39 of arms 36, receive short shafts or axles 42 upon the ends of which levers 42ª are pivotally received, said levers having their lower portions terminating in bifurcated or forked ends 42ᵇ and their upper portions curved to conform with the rear axle 5′ of automobile 5. The lower bifurcated or forked ends 42ᵇ of levers 42ª fit over pins 43 (Fig. 7) which are located in one end of sliding draw-bars 44 while the opposite bifurcated ends 44ª of said bars 44 are pivotally connected to arms 44ᵇ and 44ᶜ, respectively. Said arms 44ᵇ and 44ᶜ are pivoted beneath platform 6 upon pivot-shaft 44ᵈ. Rods 45 have one of their ends pivotally connected at 46 to the outer ends of pivoted arms 44ᵇ and 44ᶜ, respectively, as clearly shown in Figs. 5 and 7. The other ends of said rods 45 are enlarged to form locking bolts 47 which are slidably supported beneath platform 6 by bearings 48. Said locking bolts 47 are adapted to be engaged into and removed from holes 49 in the upper part of racks 29 and 29′, which will be described more fully, under operation of the device. One end of short vertical rods 50 are pivotally attached to lugs 51 which are securely attached to the underside of doors 33 and the other ends of said rods 50 are pivotally attached to end 52 of arm 36, as clearly shown in Fig. 1.

*Garage closing doors.*—When the automobile 5 is driven onto platform 6 and said platform has been lowered within underground garage 3 to the position shown by dotted lines in Fig. 1, large doors 53 cover the top of said garage 3 when in closed position. On account of the weight of doors 53, I provide a counter-balance 54 (see Fig. 3) which will enable the doors to be raised to open position shown in Fig. 2 with a minimum amount of manual labor.

*Rear axle stop mechanism.*—Stop 55 is securely fixed to one of the walls 2 near end 7 of platform 6 and is for the purpose of engaging, lever 56 hinged or pivoted at 57 to the underside of platform 6. Bifurcated lever 58 hinged at 59 to the top of platform 6 is connected to lever 56 by connecting arm 60 for the purpose of drawing said lever 58 from engagement with rear axle 5′, as will be described later under operation of the device.

*Stairs.*—At one side of the underground garage 3 I provide steps 61 which lead from the top of said garage or from the ground level 62 to the level of platform 6 when said platform is in the lowered position, as shown by dotted lines in Fig. 1, so that entrance to the garage may be made when it is desired to raise said platform to the level shown by full lines in Fig. 1.

*Platform counter-balance.*—Brackets 63 fixed to the underside of platform 6 and located approximately near the center and at each end of said platform (see Fig. 5) securely hold one end of ropes or cables 64. Said cables 64 pass over grooved pulleys 65 rotatably held within brackets 66 and have weights 67 fixed to the other ends thereof. It will, therefore, be seen that as the elevator platform 6 moves downwardly, said weights 67 are, in turn, pulled upwardly and when said platform is being raised, said weights, in turn, are lowered, thereby facilitating the raising of the platform.

*Operation.*—The operation of my device is as follows:

Assume that large doors 53 are in opened position and that platform 6 is in raised position (shown by full lines in Fig. 1) and is securely held in this position by locking bolts 47 engaging the walls of holes 49. The platform thus raised and locked is ready to receive automobile 5 which is driven onto said platform until rear axle 5′ engages levers 42ª and pushes them forward until rear axle 5′ comes in contact with ends 39 of arms 36. As levers 42ª pivoted upon axles 42 are pushed forward by rear axle 5′ the lower bifurcated or forked ends 42ᵇ fitting over pins 43 of sliding draw-bars 44 are pushed backward thereby causing said bars 44 to turn or swing pivoted arms 44ᵇ and 44ᶜ, respectively on their pivot 44ᵈ which simultaneously causes rods 45 and locking bolts 47 to be drawn inward, (as shown by dotted lines in Fig. 5) whereupon platform 6 is free to descend. It is so arranged that when rear axle 5′ is stopped by ends 39 of arms 36 rear drive wheels 4 are positioned on the large rollers 9 and small idler rollers 31 (Figs. 1 and 2).

Before the automobile 5 is driven onto platform 6, arms 36 are normally held in the position shown by dotted lines in Fig. 1 by springs 35. When ends 39 of arms 36 are held in this position the front axle of automobile 5 passes over said ends 39. As the automobile 5 advances onto platform 6, front wheels 4′ ride onto doors 33 which overcome the tension of springs 35 and force said doors 33 downwardly to the position shown by full lines in Fig. 1. As the doors 33 are pushed downward by front wheels 4', short rods 50 pivotally connected to the underside of said doors are also pushed downward and being pivotally connected to rods 36 force ends 39 of said arms 36 upward to form stops for rear axle 5', as heretofore mentioned. After said automobile has been driven onto platform 6, it is blocked from further forward progress by ends 39 of arms 36. Rear driving wheels 4 being positioned on large rollers 9 and small idler rollers 31 start to rotate large rollers 9 in an anti-clockwise direction. Large rollers or drums 9, in turn, impart motion to shaft 10 and gears 17. As gears 17 are fixed to shaft 10 and large rollers 9 are fixed to shaft 10, it will be clearly seen that said large rollers and gears will turn in an anti-clockwise direction when driving wheels 4 are driven in a clockwise direction. Gears 17 are in meshing relation with gears 16, and the latter gears being fixed to shaft 14 impart a clockwise direction to said gears 16 which are in meshing relation with racks 29. Chain 28 connecting sprockets 13 and 13' fixed on shafts 10 and 19, respectively, impart an anti-clockwise rotation of said shaft 19 when driving wheels 4 are driven in a clockwise direction. Gears 25 being fixed to shaft 19 will also revolve in an anti-clockwise direction and being in meshing relation with gears 26 fixed to shaft 20 will impart motion to said gears 26 in a clockwise direction. Gears 27 fixed to shaft 21 and in meshing relation with gears 26 will be revolved in an anti-clockwise direction. Said gears 27 are in meshing relation with racks 29'; therefore, it will be clearly seen that when rear driving wheels 4 are driven in a clockwise direction or a direction that would cause automobile 5 to move forward, platform 6 will be caused to descend within underground garage 3 to the position shown by dotted lines in Fig. 1. When it is desired to raise or elevate platform 6, simply reverse the motion of rear driving wheels 4 of automobile 5, or, in other words, turn them in an anti-clockwise direction which will reverse the rotation of gears 16 and 27. When automobile 5 and platform 6 are in the lowered position, as shown by dotted lines in Fig. 1, and it is wished to raise said platform, the rear wheels 4 are put in a reverse or anti-clockwise direction which causes rear axle 5' to move away from or release levers 42ª until bifurcated lever 58 engages said rear axle whereupon the automobile 5 is rotatably held upon rollers 9 until stop 55 engages lever 56 whereupon said bifurcated lever 58 is withdrawn by connecting arms 60 whereupon said automobile 5 may be driven off of platform 6 while locking bolts 47 automatically slide or engage within holes 49 due to springs 42ᶜ and held therein until the machine is again run onto the platform and said locking bolts again withdrawn from holes 49, as before described. With this construction it will be clearly seen that the operator of automobile 5, after opening the large doors 53, has but to drive said automobile upon platform 6 whereupon said platform is automatically unlocked and driven to the lowered position by the rear wheels.

Having thus described my invention, it will be understood that certain modifications and changes can be made without departing from the scope or spirit thereof as defined in the claims.

What I claim as new and desire to secure by Letters Patent is:

1. In an elevator for underground garages, an elevator platform, driving mechanism carried by said elevator platform and adapted to be driven by the driving wheels of an automobile when the latter is on said platform, a locking mechanism for said platform when the latter is in elevated position, said locking mechanism automatically operated by said automobile, and stops for said automobile, said stops automatically operated by said automobile and said driving-mechanism adapted to raise or lower said elevator platform in accordance with the direction of rotation of said driving wheels of said automobile.

2. In an elevator for underground garages, an elevator platform, driving mechanism carried beneath said elevator platform comprising a shaft, a pair of large drum rollers mounted on said shaft, said rollers adapted to be driven by the rear driving-wheels of an automobile when the latter is on said platform, a first and second pair of vertical racks, gears on said shaft adapted to rotate with said drum-rollers, a second pair of gears adapted to be engaged by said first mentioned gears, the second pair of gears being in meshing engagement with said first pair of racks, and a train of gears oppositely disposed from said first-mentioned gears and in meshing engagement with said second pair of racks whereby said elevator platform may be raised or lowered upon said racks, according to the direction of rotation of said driving-wheels of said automobile.

3. In an elevator for underground garages, an elevator platform, means adapted to be driven by engagement of the driving-wheels of an automobile when the latter is on said elevator platform, a locking mechanism for said platform when the latter is in elevated position comprising holes in the walls thereof, bolts adapted to enter and be withdrawn from said holes, operative mechanism connected to said bolts adapted to be engaged by the automobile for withdrawing said bolts, and a spring adapted to force said bolts into said holes when the automobile is disengaged from said locking mechanism.

4. In an elevator for underground garages, an elevator platform, mechanism carried by said elevator platform and adapted to be driven by the driving wheels of an automobile when the latter is on said platform, locking mechanism for said platform when the latter is in elevated position, means for engaging said locking mechanism operated by said automobile, a spring for disengaging said locking mechanism and stops operated by the front wheels and adapted to engage the rear axle of said automobile whereby the latter is held from forward movement relative to said platform.

5. In an elevator for underground garages, an elevator platform, locking mechanism for said platform when the latter is in elevated position, means for operating said locking mechanism, lowering and elevating means comprising vertical racks, drums in said platform adapted to engage the driving wheels of an automobile, gears mounted to turn with said drums, gears mounted on said platform and in engagement with said racks and adapted to be moved vertically along said racks by said first-mentioned gears when said drums are rotated by the rotation of said driving wheels.

6. In an elevator for underground garages, an elevator platform, driven mechanism carried by said elevator platform adapted to be operated by the driving wheels of an automobile when the latter is on said platform, mechanism for locking said platform when the latter is in elevated position, said locking mechanism automatically operated by said automobile, stops for said automobile, said stops automatically operated by said automobile, and said driven mechanism adapted to raise or lower said elevator platform in accordance with the direction of rotation of said driving wheels of said automobile, doors hinged to the top of said garage to form a cover therefor and a counter-balance attached to each door to cause easy operation thereof.

7. In an elevator for underground garages, an elevator platform having openings therein, drums mounted in said openings, rollers in said openings adjacent said drums, a stop to engage the rear axle of said automobile and hold it from forward movement, vertical racks mounted in said garage and operative mechanism connected to said drums and engaging said racks whereby when the driving wheels of an automobile are brought into contact with said drums and said driving wheels rotated, said platform will be elevated or lowered according to the direction of rotation of said driving wheels.

8. In an underground garage of the class described, an elevator platform, means on said platform whereby the latter may be raised or lowered by engagement of the rear driving wheels of an automobile when on said platform, locking mechanism for said platform when the latter is in elevated position, said locking mechanism automatically operated by said automobile, substantially as described.

9. In an underground garage of the class described, a platform, means for raising and lowering said platform, and a rear stop, adapted to be automatically engaged and disengaged with the rear axle of an automobile when upon said platform, and comprising a bifurcated arm pivotally connected to the upper side of said platform, an arm pivoted to the under side of said platform, a connecting link pivotally connected to said bifurcated arm and said lever, and a stop adapted to engage said lever, substantially as set forth and for the purposes specified.

10. In an elevator for underground garages, an elevator platform, mechanism carried by said platform and adapted to be driven by the driving wheels of an automobile when the latter is on said platform, locking mechanism for said platform when the latter is in elevated position comprising throw arms each having a bifurcated end, push links having connection with said throw arms, an arm pivoted beneath said platform, locking bolts pivotally connected to said pivoted arm, and means for operating said locking mechanism.

11. In an elevator for underground garages, an elevator platform, locking mechanism for said platform when the latter is in elevated position, means for operating said locking mechanism, lowering and elevating means for said platform adapted to be operated by the driving wheels of an automobile, forward stops on said platform adapted to be operated by the front wheels of said automobile, and a rear stop on said platform adapted to be automatically operated for the locking of the rear axle, substantially as described.

SAMUEL P. WITHROW.